US011829501B2

(12) United States Patent
Sankar et al.

(10) Patent No.: US 11,829,501 B2
(45) Date of Patent: Nov. 28, 2023

(54) DATABASE APPLICATION PASSWORD ROTATION WITH REDUCED DOWNTIME

(71) Applicant: PayPal, Inc., San Jose, CA (US)

(72) Inventors: Varun Sankar Sankar, Fremont, CA (US); Kenneth Kang, Campbell, CA (US)

(73) Assignee: PayPal, Inc., San Jose, CA (US)

( * ) Notice: Subject to any disclaimer, the term of this patent is extended or adjusted under 35 U.S.C. 154(b) by 245 days.

(21) Appl. No.: 17/334,388

(22) Filed: May 28, 2021

(65) Prior Publication Data
US 2022/0366068 A1 Nov. 17, 2022

Related U.S. Application Data

(63) Continuation-in-part of application No. 17/317,817, filed on May 11, 2021, now abandoned.

(51) Int. Cl.
*G06F 21/00* (2013.01)
*G06F 21/62* (2013.01)
*G06F 16/23* (2019.01)

(52) U.S. Cl.
CPC ...... *G06F 21/6218* (2013.01); *G06F 16/2379* (2019.01)

(58) Field of Classification Search
CPC .. G06F 16/21; G06F 16/2379; G06F 21/6218; H04L 63/10; H04L 63/83; H04L 63/108
USPC ........................................................ 707/785
See application file for complete search history.

(56) References Cited

U.S. PATENT DOCUMENTS

| | | | |
|---|---|---|---|
| 6,128,742 A * | 10/2000 | Felt | H04L 63/083 726/5 |
| 8,875,261 B2 * | 10/2014 | Delia | H04L 63/20 726/6 |
| 9,363,080 B2 | 6/2016 | Bartok et al. | |
| 9,418,236 B2 * | 8/2016 | Cabrera | H04L 63/102 |
| 9,572,032 B2 * | 2/2017 | Li | H04L 63/10 |
| 10,003,458 B2 | 6/2018 | Ylonen | |
| 10,205,729 B2 | 2/2019 | Saraf et al. | |
| 11,275,825 B1 * | 3/2022 | Kapinos | H04L 9/0894 |
| 2015/0012977 A1 | 1/2015 | Huh et al. | |
| 2015/0319144 A1 * | 11/2015 | Barton | G06F 9/544 713/168 |

(Continued)

*Primary Examiner* — Vincent F Boccio
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to methods that include an authentication management process, executing on a computer system, authorizing a plurality of applications to access a database, and sending one or more passcodes to the authorized applications. In response to an authentication update request, the method further includes selecting a new passcode for accessing the database, and sending, to a plurality of applications authorized to access the database, a notification that the new passcode is available. In response to a request from a particular application, the method also includes sending the new passcode to the particular application. The method further includes determining that each of the plurality of applications has retrieved the new passcode. In response to the determining, the method also includes enabling the new passcode for use by the plurality of applications for accessing the database.

20 Claims, 9 Drawing Sheets

(56) References Cited

U.S. PATENT DOCUMENTS

2016/0269179 A1* 9/2016 White .................. H04L 9/0897
2020/0110870 A1* 4/2020 Girdhar ................ G06F 21/316

* cited by examiner

DATABASE APPLICATION PASSWORD ROTATION WITH REDUCED DOWNTIME

PRIORITY CLAIM

The present application is a continuation-in-part of U.S. application Ser. No. 17/317,817, filed May 11, 2021, which is incorporated by reference herein in its entirety.

BACKGROUND

Technical Field

This disclosure relates generally to computer system operation, and more particularly to updating credentials for applications authorized to access a database.

Description of the Related Art

A given computer system may include one or more computers, a number of applications running on various ones of the computers. A portion of these applications may utilize a common database to access various types of information and/or processes. To access the common database, the applications may use a common set of credentials, including a particular passcode, to login to the database. Due to security concerns, frequent changing of the passcode may be desirable to prevent an unauthorized entity, e.g., a hacker, from discovering the passcode, thereby gaining access to the common database. If a hacker were to discover the passcode, frequent changing of the passcode may limit an amount of time the hacker has access to the common passcode.

A large computer system, such as a corporate, government, or university computer system may include hundreds, thousands, or more computers, and each computer may have multiple applications that login to the common database. Accordingly, frequent updates to the database login credentials may pose a daunting challenge.

DETAILED DESCRIPTION

As described above, administrators for large computer systems may desire frequent changing of passcodes to prevent hackers from gaining access to their databases. A large enterprise computer system, such as may be used by corporations, governments, or universities, may have hundreds, thousands, or even millions of active applications accessing various databases. A passcode change to even a single database with tens or hundreds of applications actively logging-in may require minutes of downtime as the applications may be locked out of the database as the passcode is updated on the database and then distributed to every application that uses the database. For some organizations, mins of downtime may equate to a collective loss of hours of productivity, missed opportunities, and a loss of revenue. Accordingly, some organizations may change passcodes less frequently than desired in order to avoid such losses.

The present disclosure recognizes a desire for a technique that enables changes to login credentials for a database and distribution of the changed passcodes to applications while reducing or eliminating the applications downtime. One embodiment of a method includes, in response to a request from a database to update a passcode, selecting, by an authentication management process, a new passcode for accessing the database, without enabling the new passcode. The authentication management process may then alert applications of the new passcode before actually updating the passcode in the database. In turn, the applications may request the new passcode from the authentication management process, which distributes the new passcode in response to an authentication of a requesting application. After all applications that are authorized to access the database have been have received the new passcode, the authentication management process may then enable the new passcode on the database. In this manner, the applications may continue to have access to the database from when the new passcode is selected until the new passcode is enabled by using the old passcode until the new one is enabled.

Use of such a method may increase a level of protection of a database against hackers by increasing a frequency for changing the passcode for the database. In addition, downtime may be reduced, or in some cases eliminated, by allowing the applications to use an old passcode until the new passcode has been distributed to all authorized applications.

Figure 1:
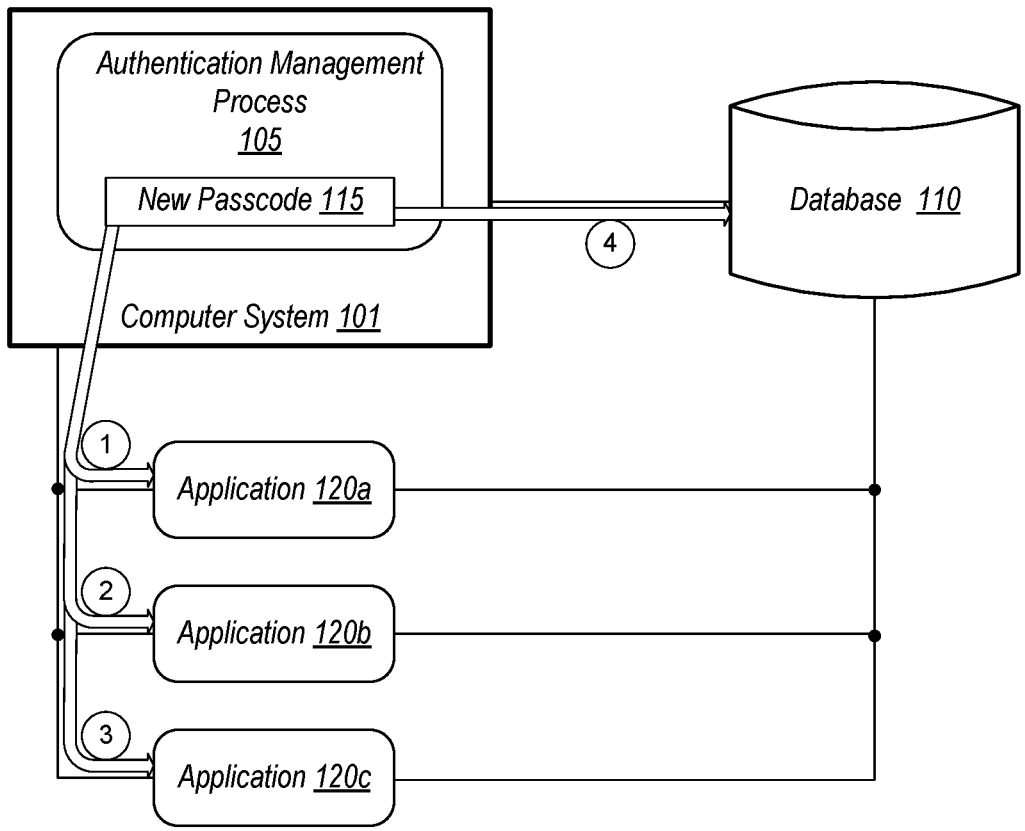
FIG. 1 is a block diagram illustrating an embodiment of a computer system coupled to a database.

A block diagram of an embodiment of a system that includes a computer system that manages access to a database by a plurality of applications is illustrated in FIG. 1. System 100 includes database 110 as well as computer system 101 that further includes authentication management process 105. Authentication management process 105 manages selection and distribution of new passcode 115 to the plurality of applications 120a-120c (collectively applications 120).

As illustrated, computer system 101 includes one or more computer devices configured to execute a plurality applications, including authentication management process 105, that are associated with database 110. In some embodiments, applications 120 are executed on computer system 101. In other embodiments, one or more of applications 120 are executed on computer systems external to, but coupled to, computer system 101. Computer system 101, in some embodiments, may be an enterprise computer system that includes a plurality of server computers located in one or more geographical locations. For example, computer system 101 may include a plurality of computers located in multiple cities and configured to execute applications 120 associated with performing various types of transactions for a plurality of subscribed users.

Database 110, as shown, includes one or more computer systems as well as non-volatile storage for retaining various types of information, including, for example, user account profiles, transaction histories, application programs, security information, and the like. To access database 110, applications 120 use an authorized passcode to login to database 110. In addition, the information and applications stored in database 110 may be encrypted, requiring a corresponding key to decrypt. Accordingly, database 110 is configured to, in response to receiving a valid passcode, grant access to a given one of applications 120 executing on computer system 101, or executing on a computer system coupled to computer system 101.

Applications 120, as illustrated, may be executed autonomously, e.g., as a result of an execution of a batch process, and therefore, may be monitored by an administrator infrequently, or not monitored at all except in the case of a system error or other type of alert. Although only three applications 120 are depicted, hundreds or thousands may access database 110 at a given point in time. Applications 120 may access database 110 to retrieve or store user account information and/or various forms of transaction data. Applications 120 may also access database 110 to execute a particular application process (e.g., an applet). As described, applications 120 may execute on computer system 101 or on one or more other computers coupled to computer system 101. In various embodiments, such other computers, computer system 101, and database 110 may be owned/managed by the same entity, different entities, or combinations thereof.

As shown, computer system 101 is configured to authorize, using authentication management process 105, applications 120 to access database 110. For example, authentication management process 105 may be configured to use a respective application context, received by a given application (e.g., application 120a) to identify application 120a, and then to provide, based on the identity of application 120a, a plurality of passcodes to application 120a. Ones of the plurality of passcodes may be used for different tasks associated with database 110. For example, a first passcode may be used to login to database 110, a second passcode to encrypt and decrypt data stored to/read from database 110, and a third passcode to establish a secure shell (SSH) with database 110 for executing one or more applets. The identity of application 120a may correspond to receiving more passcodes than, for example application 120b, due to application 120a being of a type of application that is granted more access rights than application 120b.

In some embodiments, sending a plurality of passcodes to application 120a includes providing a set of passcodes to application 120a, in which a given one of the set of passcodes is valid at a given point in time. For example, the set of passcodes may include a plurality of passcodes for logging-in to database 110. At any given point in time, however, only one of the passcodes may be used to successfully login to database 110.

As used herein, "passcode" refers to any suitable form of authorization credentials provided by a first entity to enable access to a second entity via a network connection such as a local-area network (LAN), a wide-area network (WAN), a wireless-area network (WLAN), and the like. Accordingly, passcodes may, in some embodiments, refer to a traditional username and password that is provided, by the first entity, upon request by the second entity. In other embodiments, the passcode may include use of a digitally-signed certificate, a synchronized rolling code, etc. In some embodiments, the passcode is a symmetric key, and authentication management process 105 may further distribute an additional asymmetric key and/or a secure shell protocol (SSH) key.

As shown, database 110 is further configured, in response to a determination that the valid passcode has not been updated for a threshold amount of time, to send an authentication update request to authentication management process 105, executing on computer system 101, to select a new passcode. In response to the authentication update request, computer system 101 is further configured to generate, using authentication management process 105, new passcode 115. In embodiments in which a plurality of passcodes are distributed for use with different tasks (e.g., logging-in, encryption, establishing an SSH, and so forth), to generate new passcode 115, computer system 101 may be configured to generate respective new passcodes 115 for each of the plurality of passcodes. In other embodiments in which a set of passcodes is distributed for a single task (e.g., logging-in only) then selecting new passcode 115 may include selecting, by authentication management process 105, a least recently used passcode from the set of passcodes as new passcode 115. In such an embodiment, rather than sending new passcode 115, computer system 101 may send an indication of which passcode of the set is now valid.

After new passcode 115 has been selected, computer system 101 may be further configured to notify applications 120 that new passcode 115 is available. Applications 120 may be configured to authenticate with database 110 on a periodic basis. In response to receiving the notification from computer system 101, a particular one of applications 120, e.g., application 120c, may, at the next re-authentication time, request new password 115 from computer system 101. In response to the request from application 120c, computer system 101 is further configured to send new passcode 115 to application 120c. Other ones of applications 120 may issue similar requests at their respective next re-authentication times. Computer system 101 may be further configured to determine, using authentication management process 105, whether each of applications 120 has retrieved new passcode 115. In response to a determination that all applications 120 have received new passcode 115, computer system 101, using authentication management process 105, may enable new passcode 115 for use by database 110. Any attempts at logging-in to database 110 after new passcode 115 is enabled in database 110 will require new passcode 115 in order to be successful. Prior to enabling new passcode 115 in database 110, login attempts required the previous passcode, regardless if a given one of applications 120 had yet to receive new passcode 115.

Each of applications 120, as shown, can have access to database 110 between receiving new passcode 115 and the enabling of new passcode 115 in database 110. For example, if application 120c receives new passcode 115 before applications 120a and 120b and attempts to login to database 110 using new passcode 115, then the login attempt will fail. Application 120c, in response to the failed attempt, may be configured to retry the login attempt using a previous passcode. Application 120c may retry any suitable number of previously used passcodes until either the login attempt is successful, or a maximum number of attempts have been made. If a maximum number of attempts has been reached without a successful attempt, then application 120 may proceed to login using a particular login method that places application 120c into a protected mode. Such a protected mode may restrict access by application 120 to database 110.

In some embodiments, an error or other type of notification may be sent to a system administrator to inform them of the failure to successfully login. In addition, application 120*c* may attempt an additional set of authentication retries at a next periodic interval.

As described above, database 110 may be configured to request an update to the passcode after a threshold amount of time elapses from the previous passcode update. Database 110 may request passcode updates for other reasons. For example, database 110 may be further configured, in response to detecting a threshold number of failed login attempts, to alert computer system 101 of the failed attempts. In response to the alert, computer system 101 may be further configured to generate, using authentication management process 105, a different passcode, and notify applications 120 that the different passcode is available. In another example, database 110 may be further configured, in response to detecting abnormal activity, to alert computer system 101 of this activity. In a similar manner, computer system 101 may again be configured, in response to this alert, to generate a different passcode, and to notify applications 120 that the different passcode is available. In response to such notifications, the applications may request the different passcodes as described above.

Use of such techniques may enable an increased frequency for updating a passcode for a database, thus improving a level of security of the database against hackers gaining access to the database. These described techniques allow a plurality of applications, which could number into the hundreds, thousands, or even more, to maintain access to the database with little to no downtime due to waiting for a new passcode to be fully distributed.

It is noted that the embodiment of FIG. 1 is merely an example. Features of the system have been simplified for clarity. As disclosed, the described computer system 101 may represent a computer acting as an authentication manager for applications running on the computer or on other computer systems coupled to the computer. For example, system 100 may provide a transaction management service to subscribed users in which applications 120 receive transaction requests from particular users and then complete the transactions using information and/or applications stored in database 110.

The system of FIG. 1 includes a description of an application retrying old passcodes when a new passcode has not yet been enabled. A particular example of an application cycling through previously used passcodes is shown in FIG. 2.

Figure 2:
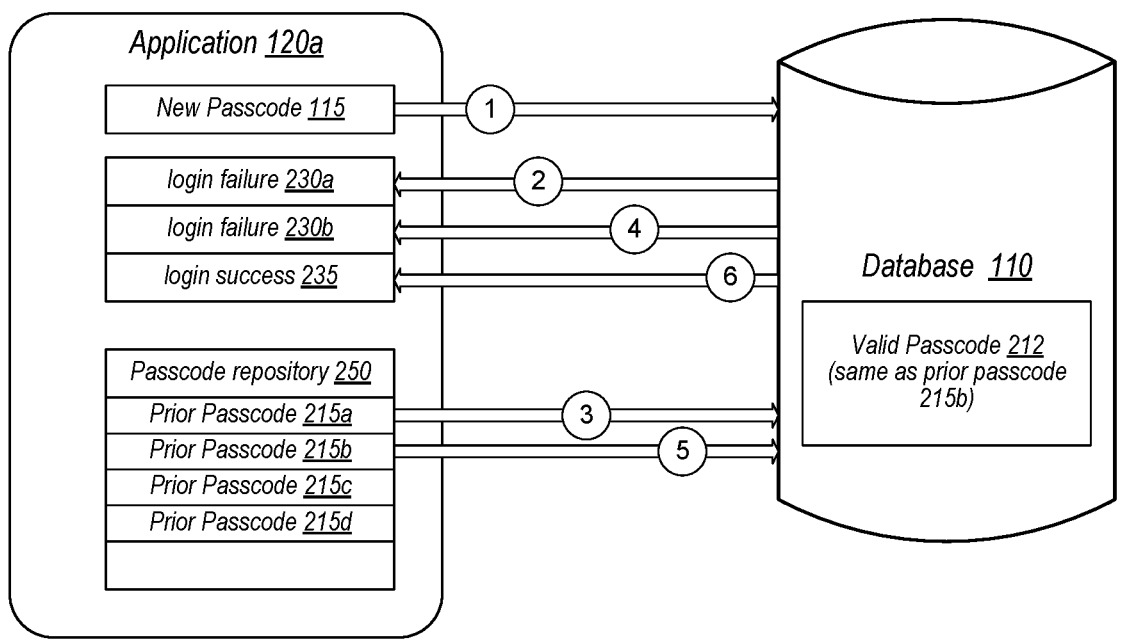
FIG. 2 shows a block diagram of an embodiment of an application executing on the computer system of FIG. 1 logging into the database.

Moving to FIG. 2, an embodiment of system 100 is shown that includes application 120*a* and database 110. As illustrated, application 120*a* performs a series of login attempts to database 110. FIG. 2 depicts a technique for cycling through new passcode 115 as well as prior passcodes 215*a*-215*d* (collectively prior passcodes 215) for each successive login attempt.

As illustrated, application 120*a* has received new passcode 115. New passcode 115, however, has not been enabled in database 110, and database 110 is therefore still using one of prior passcodes 215 (215*b* in this example) as valid passcode 212. Using the rollback techniques described herein, application 120*a* continues to have access to database 110 between receiving new passcode 115 and the enabling of new passcode 115 after all applications 120 have received new passcode 115. The continued access is achieved by using, by application 120*a* at a first time, new passcode 115 to access database 110. Since new passcode 115 has not been enabled at this point, database 110 returns an indication of login failure 230*a* to application 120*a*.

Applications 120 may use passcode repository 250 for storing prior passcodes 215. In some embodiments, applications 120 store a given new passcode 115 into passcode repository 250 in response to a first successful use of given new passcode 115. In response to the indication of login failure 230*a*, application 120*a* accesses passcode repository 250 and uses a previous passcode (prior passcode 215*a*) to access database 110. Since database 110 is using prior passcode 215*b* as valid passcode 212, this retry attempt also fails and an indication of login failure 230*b* is sent to application 120*a*. Application 120*a* repeats the login retry attempts using different ones of prior passcodes 215 until login success 235 is indicated by database 110, in this example, after prior passcode 215*b* is used. Applications 120 may utilize any suitable technique for selecting one of prior passcodes 215 to use for a given retry attempt. For example, application 120*a* may select prior passcode 215*a* for the first attempt in response to determining that prior passcode 215*a* is the most recently used passcode or is the most recent passcode to be added to passcode repository 250.

In some embodiments, applications 120 may be limited to a particular number of unsuccessful retry attempts before ceasing the retry attempts. For example, in response to unsuccessfully trying the particular number of prior passcodes 215, application 120*a* reverts to a protected access mode. This protected access mode may limit the access of application 120*a* within database 110. For example, database 110 may include particular security zones, each with a different level of security clearance needed by an application for accessing information located within the respective zone. The protected access may only allow application 120*a* to access zones with the lowest level of security clearance. If application 120*a* reaches the particular number of unsuccessful retry attempts, then, in addition to being placed in the protected mode, a notification may be sent to a system administrator alerting them of the login failures.

It is noted that the example of FIG. 2 is for demonstrating the disclosed concepts. Only details related to these concepts have been illustrated. Other portions of system 100 are omitted for clarity. In other embodiments, additional steps may be included in each login attempt. Although application 120*a* is depicted as communicating directly with database 110, other computer systems, networking switches and access points may be included in other embodiments.

Figure 3:
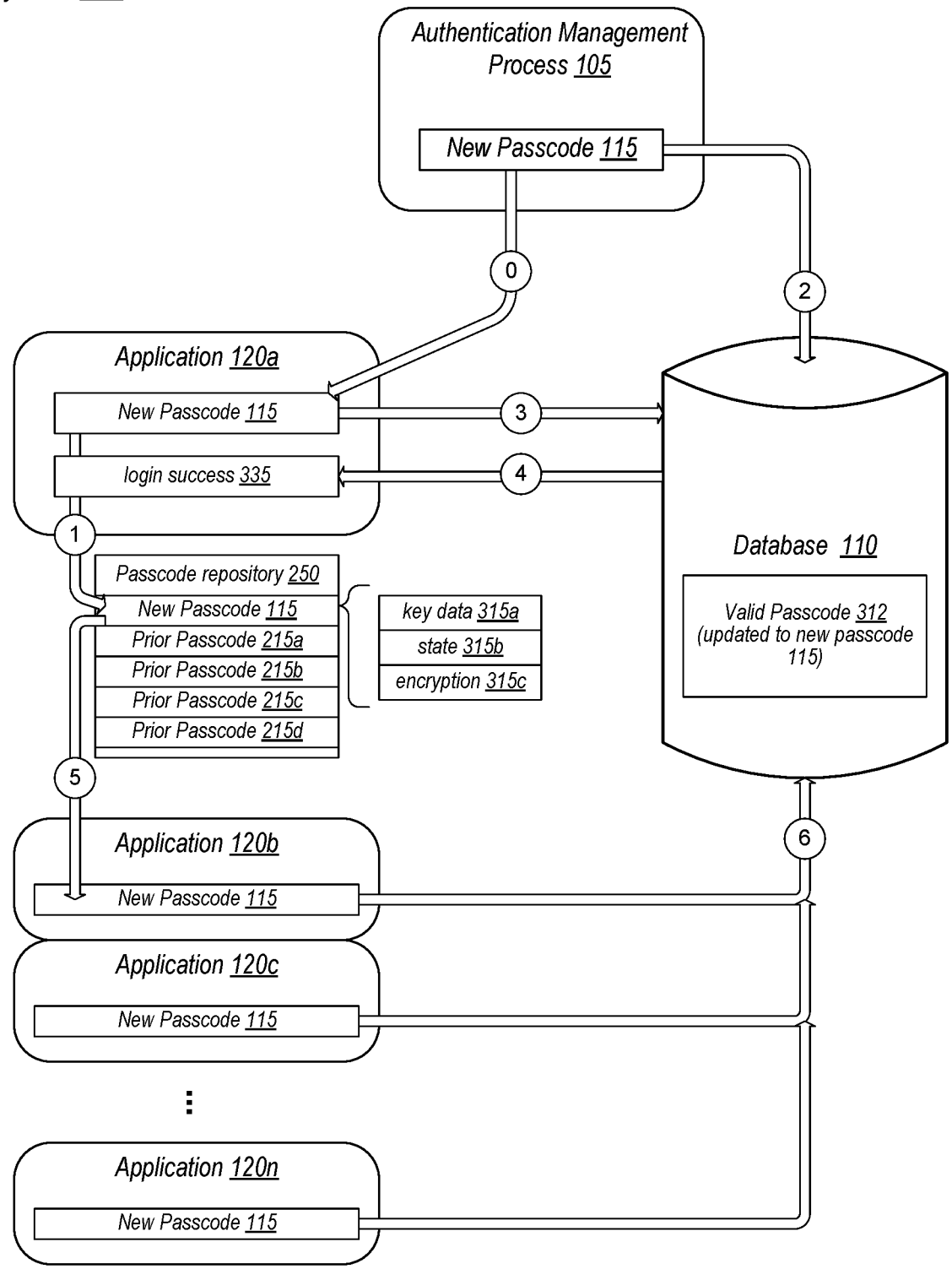
FIG. 3 depicts a block diagram of an embodiment of a passcode management system distributing a set of passcodes to a pool of applications.

FIG. 2 illustrates an example of one application maintaining access to a database while a new passcode is being distributed among a plurality of applications. Distribution of the new passcode may be accomplished by a variety of techniques. In FIG. 3, one of these techniques is depicted.

Turning to FIG. 3, an embodiment of system 100 is illustrated in which application 120*b* receives new passcode 115 via application 120*a*. System 100 includes authentication management process 105, database 110, applications 120*a*-120*n*, and passcode repository 250. In the example of FIG. 3, authentication management process 105 is rolling out new passcode 115 to applications 120.

As illustrated in the example, application 120*a*, in response to receiving new passcode 115 from authentication management process 105, stores a local copy of new passcode 115 in passcode repository 250. Passcode repository 250 may include any suitable memory circuits included in system 100 and accessible by application 120*a* before logging-in to database 110. For example, passcode repository 250 may be included in random-access memory (RAM) and/or non-volatile memory in a computer that is hosting application 120a.

As shown, new passcode 115 includes multiple values, including key data 315a, state 315b, and encryption 315c. Key data 315a is the actual key value that is sent to database 110 to authenticate, when enabled, application 120a. State 315b provides an indication whether key data 315a is currently enabled for use with database 110. For example, state 315b may be a Boolean value set to either, "enabled" (true) or "disabled" (false). Encryption 315c indicates whether key data 315a is encrypted. In some embodiments, encryption 315c may also be a Boolean value indicating whether encryption is "enabled" (true) or "disabled" (false), while in other embodiments, encryption 315c may be a numeric or string value that indicates a type of encryption used (e.g., "AES256" to indicate use of Advanced Encryption Standard (AES) format with a 256 bit key, or "none" to indicate no encryption used).

When authentication management process 105 provides new passcode 115 to application 120a, state 315b may be set to "disabled." Application 120a stores the local copy in passcode repository 250. When a particular set of conditions are satisfied for distributing new passcode 115, authentication management process 105 enables new passcode 115 in database 110. As described above, one particular set of conditions may be a confirmation that all applications 120 have received new passcode 115. In some embodiments, however, such as when there may be thousands of active applications 120, waiting for each one of applications 120 to request and subsequently receive new passcode 115 may take an unacceptably long amount of time to complete, or may result in a sudden rush by a large portion of the active applications 120 to request new passcode 115.

To mitigate issues with distributing new passcode 115, authentication management process 105 may accept one request for new passcode 115 from each of a plurality of application pools. Applications 120 may be pooled using a variety of techniques. For example, in an embodiment of system 100 in which applications 120 are spread across multiple computers included in system 100, groups of applications 120 executing on a common computer may be grouped into a single pool. In other embodiments, applications 120 may be pooled based on a type of application, applications related to a common process or end-user, and the like. In an example, application 120a may be a parent process that spawns applications 120b-120n. Application 120a is responsible, in such an example, for requesting new passcode 115 and then for determining when new passcode 115 is enabled.

Accordingly, at a latter point in time, application 120a may attempt to use key data 315a to match valid passcode 312 for logging into database 110. In response to receiving indication of login success 335 from database 110, application 120a stores an indication in state 315b that new passcode 115 is enabled. In addition, application 120a may update an indication that the previously enabled passcode (e.g., prior passcode 215a) is now disabled by setting a respective state value for prior passcode 215a.

As illustrated, applications 120b-120n cycle through passcode repository 250 to identify a currently enabled passcode based on respective values of state 315b. Accordingly, applications 120b-120n may use the local copy of new passcode 115 in response to the indication in state 315b that new passcode 115 is enabled. By using such a pooled technique, applications 120b-120n do not send respective requests for new passcode 115 to authentication management process 105, thereby reducing an amount of network traffic that may occur in response to a distribution of a new passcode.

It is noted that FIG. 3 is merely an example for demonstrating the disclosed concepts. Only elements for describing the concepts have been illustrated. In other embodiments, additional elements may be included, such as other computer systems, networking switches and access points used for enabling communication between authentication management process 105, applications 120, and database 110.

Figure 4:
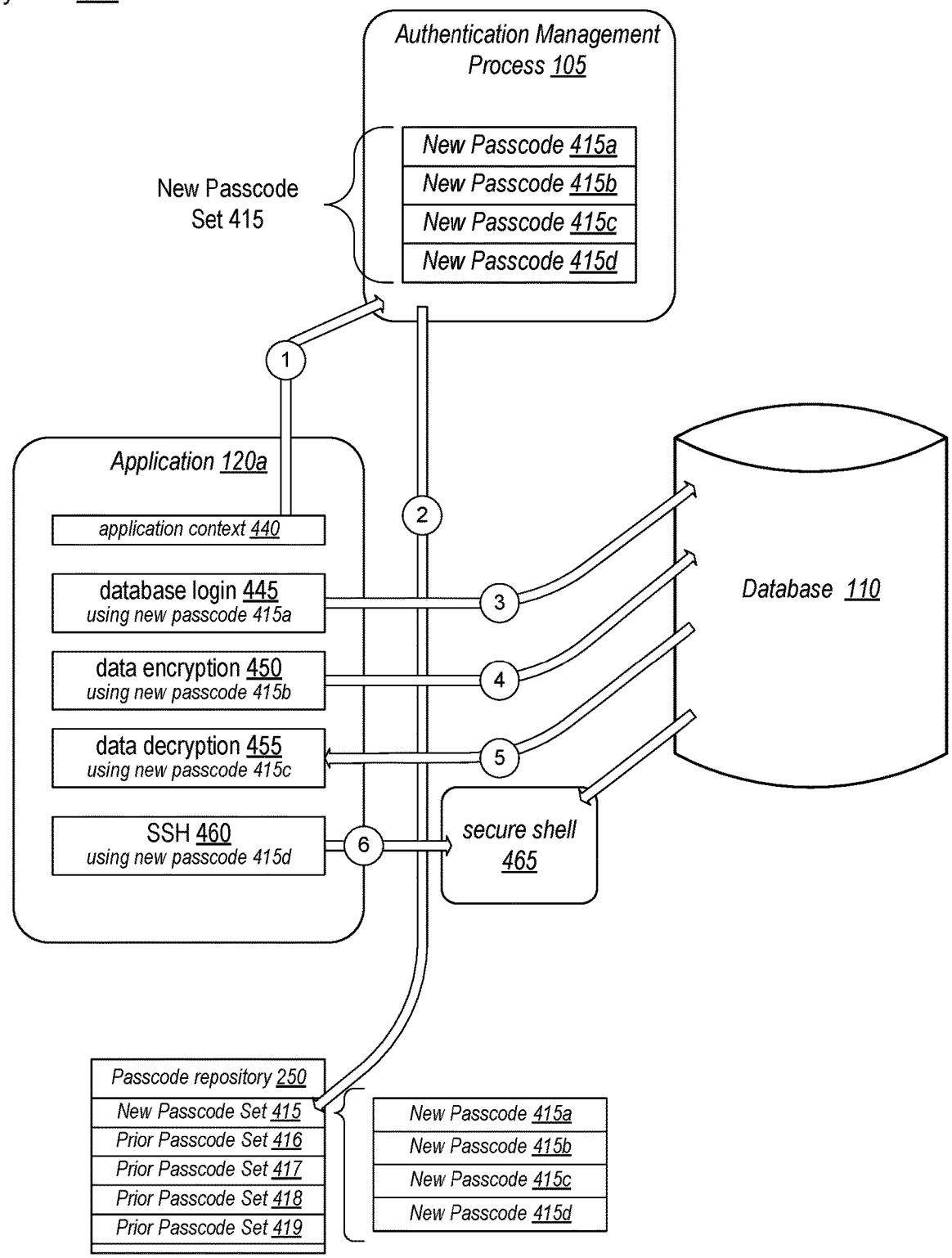
FIG. 4 shows a block diagram of an embodiment of a passcode management system distributing a set of passcodes to an application.

FIGS. 2 and 3 illustrate examples of applications utilizing and updating a passcode to access a database. Passcodes may be distributed and used for a variety of tasks. In FIG. 4, several examples of uses for passcodes are presented.

Proceeding to FIG. 4, an embodiment of system 100 is depicted in which an application receives a new set of passcodes rather than a single passcode. System 100 includes authentication management process 105, database 110, application 120a, and passcode repository 250. In the example of FIG. 4, authentication management process 105 is distributing new passcode set 415 to application 120a.

As shown in the example, to authorize application 120a to access database 110, authentication management process 105 is configured to use application context 440 to identify application 120a from others of the plurality of applications 120. In response to receiving a notification that a new passcode is available, application 120a, as previously described, sends a request to authentication management process 105 for the new passcode. In the present example, application 120a sends application context to authentication management process 105 to identify itself. In various embodiments, application context 440 may be included as a part of the new passcode request or may be sent separately as part of an authentication step. Application context 440 includes one or more values that provide information associated with application 120a, such as an application identity (e.g., a process ID), an application type (e.g., a security application, a transaction execution process, a fraud detection process, an archiving process, and the like) of the application, a location of the application (e.g., a computer node ID, an internet protocol (IP) address, a geographic or site location, and so forth), a security level assigned to the application (e.g., a numeric value within a predetermined range of security levels), and the like.

Authentication management process 105 may be configured to provide, based on values received in application context 440, new passcode set 415 to application 120a. New passcode set 415 includes, as shown, four passcodes, identified in FIG. 4 as new passcodes 415a-415d. Individual passcodes of new passcode set 415 can be used for different tasks associated with database 110. As illustrated, application 120a uses new passcode 415a, in a manner similar to new passcode 115 as described above, for data base login 445 to access database 110. Once logged into database 110, application 120a may use new passcode 415b for data encryption 450 to encrypt data before storing the encrypted data on database 110. Application 120a may use new passcode 415c for data decryption 455 of a data packet received from database 110. New passcode 415d may be used by application 120a to establish a secure shell (SSH 460) with database 110.

In addition to new passcode set 415, prior passcode sets 416-419 can also be received by application 120a and stored in passcode repository 250 after being received. In some embodiments, each passcode set is received in response to a request from application 120a after having received a corresponding notification that the respective passcode was available. In other embodiments, application 120*a*, during an initialization procedure, may authenticate, using application context 440 as described, with authentication management process 105 and based on application context 440, receive multiple passcode sets, including the depicted new passcode set 415 and prior passcode sets 416-419, as part of this initialization procedure. Thereafter, notifications from authentication management process 105 may include an indication of which one of passcode sets 415-419 is the current active passcode.

Regardless of whether passcode sets 415-419 are distributed one at a time during a passcode update or distributed as a batch as part of an initialization procedure, all passcodes in a selected passcode set may be enabled and disabled as a set. Despite setting the state of each passcode set 415-419, the individual passcodes (e.g., new passcodes 415*a*-415*d*) may be utilized at different points in time. For example, new passcode 415*a* may not be enabled for logging-in to database 110 despite receiving a notification from authentication management process 105 due to other applications 120 not yet receiving new passcode 415*a*. Accordingly, application 120*a* cycles through prior passcode sets 416 to try each respective login passcode until identifying the one that is currently enabled in database 110.

At a point in time after successfully logging-in to database 110 using a prior passcode, application 120*a* may have a data packet to store in database 110. Accordingly, application 120*a* can be configured to identify a currently enabled passcode to encrypt the data packet to store in database 110 by iterating through passcode sets 415-419 until an enabled indication is identified (e.g., a corresponding state 315*b* is set to "enabled," as described for FIG. 3). By this point in time, new passcode 415*b* may have been enabled, or the prior passcode set that was used to login may still be enabled. After the current enabled passcode set is identified, application 120*a* uses the corresponding encryption passcode to encode the data packet, and may then store the data packet in database 110.

In a similar manner, application 120*a* may receive an encrypted data packet from database 110. Application 120*a* is configured to identify a particular passcode to decrypt the received data packet by iterating through passcode sets 415-419 and using the respective decryption passcodes until the data packet is successfully decrypted. Since a given data packet stored on database 110 may be encrypted for storage at any particular point in time, the corresponding decryption passcode may correspond to any one of passcode sets 416-419.

To establish secure shell 465, application 120*a* may use a similar process as for identifying the enabled encryption passcode. Application 120*a* is configured to identify a currently enabled SSH passcode by iterating through passcode sets 415-419 until an enabled indication is identified (e.g., a "enabled" value for the corresponding state value, such as shown in FIG. 3). The identified passcode is then used for exchanging information in secure shell 465.

It is noted that FIG. 4 is an example. In other embodiments, different elements and/or a different number of elements may be included. For example, as shown, passcode sets include separate passcodes for encrypting and decrypting data, e.g., to support asynchronous encryption algorithms. In other embodiments, synchronous encryption algorithms may be used and, therefore, a single encryption/decryption passcode may be used.

FIGS. 1-4 describe systems and techniques for managing passcode rotation and distribution. These techniques may be implemented using a variety of methods, FIGS. 5-8 depict three methods that may be utilized in passcode management system.

Figure 5:
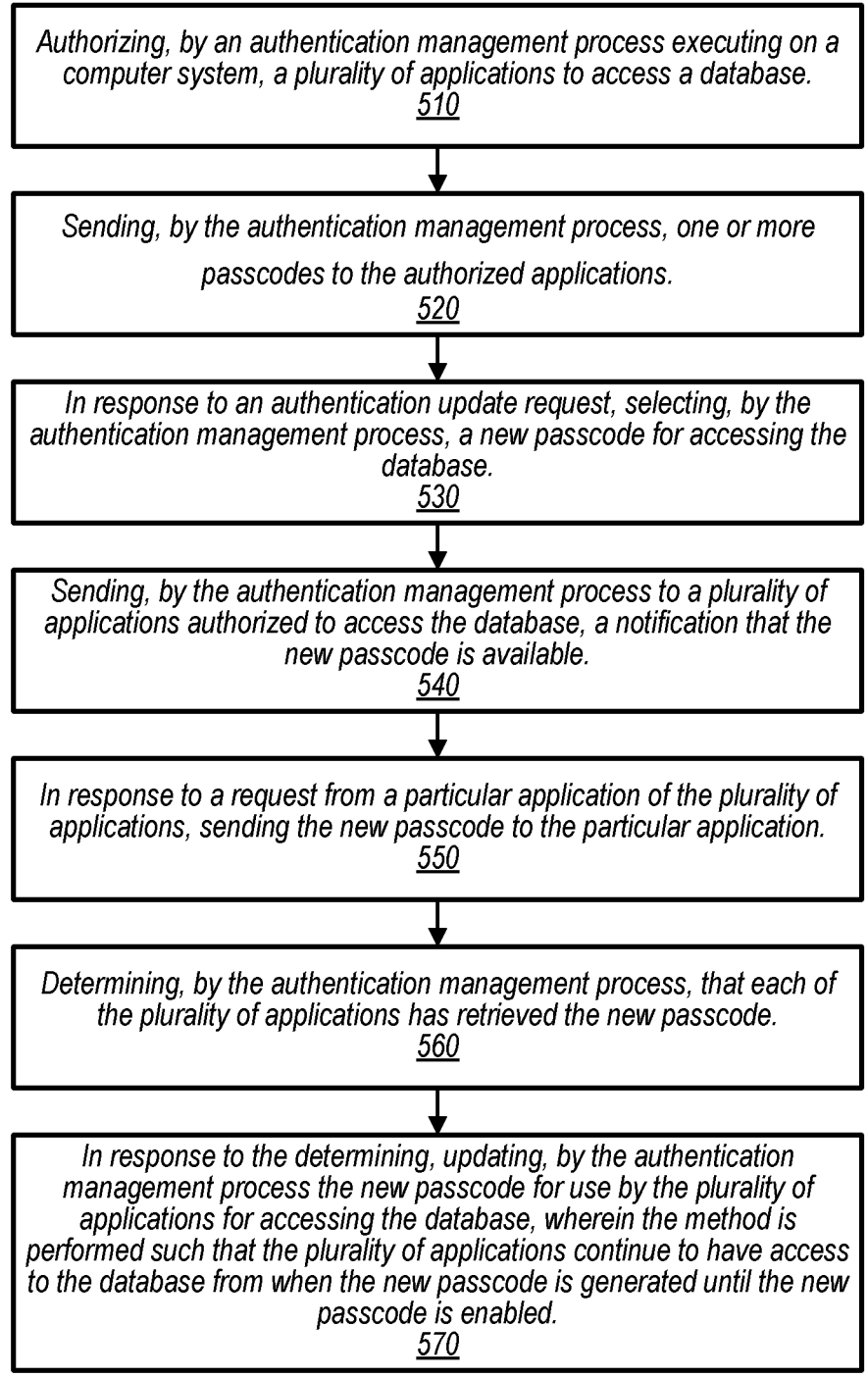
FIG. 5 illustrates a flow diagram of an embodiment of a method for updating a passcode for a plurality of applications to access a database.

Moving now to FIG. 5, a flow diagram of an embodiment of a method for distributing a new passcode by an authentication management process is illustrated. In various embodiments, method 500 may be performed by a computer system in system 100 in FIGS. 1-4. For example, computer system 101 may include (or have access to) a non-transitory, computer-readable medium having program instructions stored thereon that are executable by the computer system to cause the operations described with reference to FIG. 5. Referring collectively to FIG. 1 and method 500 in FIG. 5, the method begins in block 510.

Method 500, in block 510, includes authorizing, by authentication management process 105 executing on computer system 101, a plurality of applications 120 to access database 110. As illustrated, authentication management process 105 is configured to manage passcodes used to access database 110. Applications that will access database 110 may, such as during an initialization procedure, provide credentials to authentication management process 105, which may then validate the requesting applications to ensure they are authorized to access database 110. For example, applications 120*a*-120*c* may, at various points in time, submit respective application contexts (e.g., application context 440 in FIG. 4) to authentication management process 105. In turn, authentication management process 105 may use the respective application contexts to determine if the respective one of applications 120 has sufficient privileges to access database 110.

At block 520, method 500 further includes sending, by authentication management process 105, one or more passcodes to authorized applications 120. After determining that particular ones of applications 120 have sufficient privileges to access database 110, authentication management process 105 may send the one or more passcodes to the authorized applications 120. In some embodiments, this sending includes providing a set of passcodes to individual ones of the authorized applications 120. In such embodiments, a given one of the set of passcodes is valid at a given point in time. For example, instead of a single passcode for logging-in to database 110, authentication management process 105 sends a complete set of passcodes, e.g., ten different passcodes. At any given point in time, a single one of these ten passcodes may be valid for allowing access to database 110. Authentication management process 105 may then manage which of the ten passcodes is valid at any point in time.

Method 500 also includes, at block 530, in response to an authentication update request, selecting, by authentication management process 105, new passcode 115 for accessing database 110. In an embodiment, database 110 may track an elapsed time since the valid passcode was last changed. If a threshold amount of time is reached without a change, then database 110 may send the authentication update request to authentication management process 105. In other embodiments, authentication management process 105 may track the elapsed time itself, or a different process on computer system 101 may perform the time tracking. In some embodiments, other conditions may trigger an authentication update requests, such as a detection of a possible hacking attempt as described above in regards to FIG. 1. If as disclosed above, a set of passcodes is provided to authorized applications 120, then selecting new passcode 115 includes selecting, by authentication management process 105, a least recently used passcode from the set of passcodes. In such an embodiment, the valid passcode may be rotated among the set, selecting, for example, the least recently used passcode as new passcode 115.

Method 500, at block 540, also includes sending, by authentication management process 105 to a plurality of applications 120 authorized to access database 110, a notification that new passcode 115 is available. After authentication management process 105 has selected new passcode 115, a notification may be sent to ones of applications 120 that have been authorized to access database 110. This notification may simply alert each of applications 120 that new passcode 115 is available. In the case of applications receiving the initial set of passcodes, the notification may indicate that a new one of the set has been selected, but the notification may not provide an indication of which one of the set has been selected.

At block 550, method 500 includes, in response to a request from a particular application 120c of the plurality of applications 120, sending new passcode 115 to application 120c. Application 120c, as shown, receives the notification of new passcode 115. In response, application 120c may send a request to authentication management process 105 to receive new passcode 115. Application 120c may send the request immediately after receiving the notification. This however, may generate a rush of network traffic if a large number (e.g., hundreds or thousands) of applications receive the notification and all requests new passcode 115 during a same time period. In some embodiments, to avoid a potential spike in network traffic, applications 120 may be configured to periodically authenticate with database 110, and after receiving the notification, will send the request for new passcode 115 at the end of the subsequent period. This may distribute new passcode requests such that traffic spikes may be avoided. Other mitigation techniques may also be utilized.

Method 500 further includes, at block 560, determining, by authentication management process 105, that each of applications 120 has retrieved new passcode 115. Authentication management process 105, as shown, may track which of the authorized applications 120 have requested and received new passcode 115. Once all authorized applications 120 have received new passcode 115, then the method may move to block 570. In other embodiments, authentication management process may not wait for all authorized applications to receive new passcode 115 before proceeding to block 570. For example, as shown in FIG. 3, groups of applications 120 may be pooled, and the pooled applications may share passcodes. In such embodiments, authentication management process 105 may track that at least one application in each pool has received new passcode 115.

In some embodiments, authentication management process may track that a threshold number of authorized applications 120 have received new passcode 115. For example, authentication management process 105 may determine that a threshold percentage (e.g., 75%) of authorized applications 120 have received new passcode 115 and then proceed to block 570. In such embodiments, the passcode may be rotated more frequently by not waiting for all applications to request the new passcode. Applications 120 that do not receive the new passcode before the enabling, however, may be forced to request new passcode 115 before proceeding to access database 110. The new passcode rotation may also be utilized to withdraw authorization of applications 120 that are no longer are allowed to access database 110. For example, application 120b may have a time limit for accessing database 110, and in response to a determination by authentication management process 105 that the time has expired, authentication management process 105 does not send the notification to application 120b. Such a technique may also be used to withdraw authorization from applications that are exhibiting unusual behavior, which may be indicative of a hacking attack being performed on the application. Withdrawing the authorization by skipping the notification of the application in question may reduce chances of such a hacking attack being successful.

At block 570, method 500 further includes in response to the determining, enabling, by authentication management process 105, new passcode 115 for use by applications 120 for accessing database 110. After all authorized applications have received new passcode 115, then new passcode 115 may be enabled on database 110. After a first one of applications 120 receives new passcode 115, but prior to enabling new passcode 115 on database 110, database 110 may continue to use the prior passcode for allowing access to applications 120. In this manner, applications 120 that have not yet received new passcode 115 may continue to access database 110 with their current version of the passcode. Ones of applications 120 that have received new passcode 115 may be capable of accessing database 110 using a prior version of the passcode that has been stored, e.g., in passcode repository 250 as shown in FIGS. 2-4.

By using the disclosed techniques, method 500 is performed such that applications 120 continue to have access to database 110 from when new passcode 115 is selected until new passcode 115 is enabled in database 110, resulting in a reduction or elimination of downtime for the applications 120 during a passcode update. In turn, reducing or eliminating the downtime may enable more frequent updates to the passcodes for accessing databases. The more frequent updates may result in an increase in protection from hacking attacks.

It is noted that the method of FIG. 5 includes elements 510-570. Method 500 may be repeated in response to a subsequent requests for a passcode update, for example, returning to block 530 in response to an update request. In some cases, method 500 may be performed concurrently with itself, for example, multiple databases may be managed by authentication management process 105, each database updating its respective passcode at a respective interval. In such cases, two or more processor cores, or process threads in a single core, in computer system 101 may perform method 500 independently from one another. Although seven blocks are shown for method 500, additional blocks may also be included in other embodiments. For example, one or more additional blocks may be included for performing multiple factor authentication during the initial authorizing in block 510.

Figure 6:
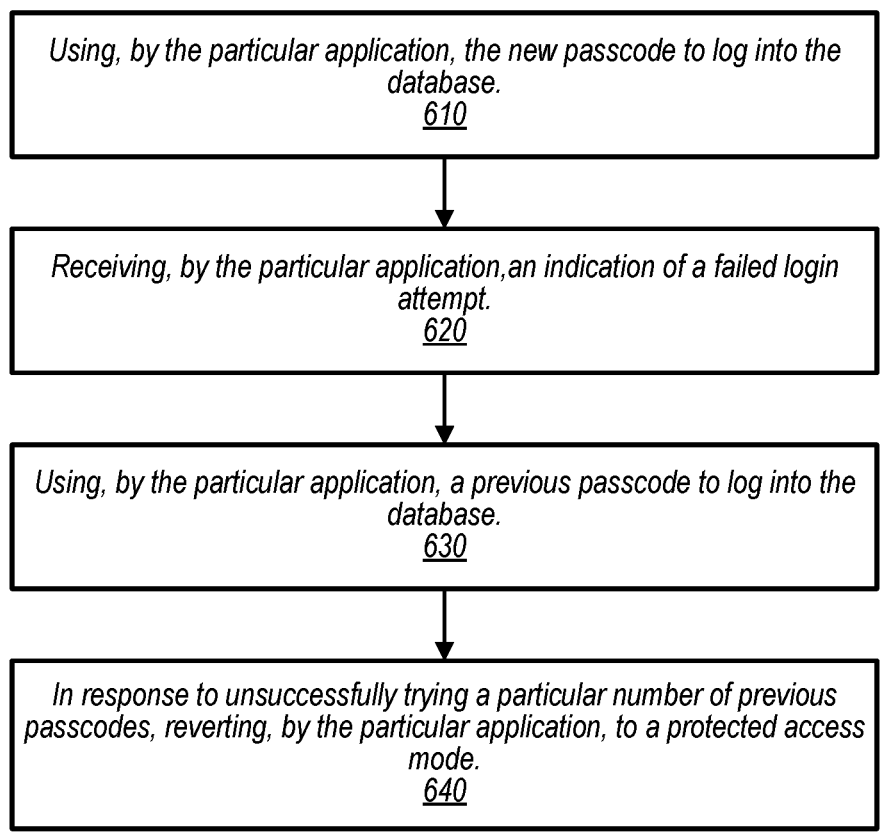
FIG. 6 shows a flow diagram of an embodiment of a method for an application to login to a database during a rollout of a new passcode.

Proceeding now to FIG. 6, a flow diagram of an embodiment of a method for retrying prior passcodes during a login attempt is illustrated. In various embodiments, method 600 may be performed by a computer in system 100 in FIGS. 1-4, such as computer system 101 or a different computer that isn't shown. The computer may, for example, include (or have access to) a non-transitory, computer-readable medium having program instructions stored thereon that are executable by the computer system to cause the operations described with reference to FIG. 6. Referring collectively to FIG. 2 and method 600 in FIG. 6, the method begins in block 610 after application 120a receives a notification of new passcode 115 from authentication management process 105 of FIG. 1.

Method 600, in block 610, includes using, by application 120a, new passcode 115 to access database 110. Application 120a, as shown, may receive new passcode 115 after sending a request to authentication management process 105 as described in regards to block 550 of method 500. The operations of method 600 may, for example, occur after block 550 has been performed by authentication management process 105, but before operations of block 570 occur. During this time, application 120*a* has new passcode 115 for logging-in to database 110, but database 110 has not been updated to accept new passcode 115. Application 120*a*, however does not know when new passcode 115 is enabled for database 110, and therefore, attempts to use new passcode 115 to login.

At block 620, method 600 further includes receiving, by application 120*a*, an indication of a failed login attempt. As described, new passcode 115 is not yet enabled for database 110, and therefore, application 120*a* receives login failure 230*a*. Login failure 230*a* may be sent by database 110, and may, in some embodiments, include a failure mode indicative of the login failure being in response to use of an incorrect passcode. In other embodiments, login failure 230*a* may, for security reasons, not provide any additional details other than that the login attempt failed.

Method 600 also includes, at block 630, using, by application 120*a*, a previous passcode to access database 110. In response to login failure 230*a*, application 120*a* may retrieve a different passcode to try another login attempt to database 110. For example, application 120*a* includes, or has access to, passcode repository 250 in which multiple passcodes are stored. Prior passcodes 215*a*-215*d* may, in some embodiments, be older passcodes that have been successfully used to login to database 110. In other embodiments, application 120*a*, during an initialization process, may be sent a plurality of passcodes for use with database 110. This plurality of passcodes are enabled, by authentication management process 105 at various points in time for use with database 110.

Application 120*a*, as shown, may utilize any suitable technique for selecting one of prior passcodes 215 for a next retry attempt. For example, application 120*a* may use the most recently used one of prior passcodes 215. In some cases, a given passcode may be received by application 120*a*, but not used by the time new passcode 115 is received, causing application 120*a* to skip use of the given passcode. In such embodiments, application 120*a* may select one of prior passcodes 215 based on an order in which prior passcodes 215 were received, rather than when they were last used. In other embodiments, application 120*a* may select prior passcodes 215 in a predetermined order, e.g., an order provided by authentication management process 105.

Method 600, at block 640, also includes in response to unsuccessfully trying a particular number of prior passcodes 215, reverting, by application 120*a*, to a protected access mode. Application 120*a*, as shown, may receive login failure 230*b* in response to the use of the selected one of prior passcodes 215 for logging-in to database 110. In response to login failure 230*b*, application 120*a* may continue to retry login attempts using a different one of prior passcodes 215 for each attempt. In some embodiments, application 120*a* may continue to retry login attempts until a successful attempt is made. In other embodiments, application 120*a* is limited to a threshold number of attempts without a successful login. If the threshold is satisfied (e.g., the number is met or exceeded in various embodiments), then application 120*a* is allowed to access database 110 in the protected mode. In some embodiments, protected mode is entered by logging-in to database 110 using a particular passcode that is not updated, or is updated less frequently than the standard passcode such as new passcode 115.

As illustrated, the protected access mode limits the access of application 120*a* within database 110. For example, database 110 may include multiple zones or groups of files that are accessible based on a security level assigned to a given application. If application 120*a* performs a successful login to database 110, then application 120*a* may have a security level that allows access to a particular set of the zones or groups of files. If, however, application 120*a* fails to perform a successful login, then application 120*a* is placed, by database 110, into the protected mode that may restrict application 120*a* from one or more of these zones or groups of files.

It is noted that method 600 may be repeated in response to a subsequent passcode update, for example, returning to block 610 in response to receiving a subsequent new passcode to new passcode 115. In some cases, method 600 may be performed by a two or more processor cores in a multicore system, or by two or more process threads in a multi-threaded core. Accordingly, multiple instances of method 600 may be performed concurrently and independently from one another in such systems. For example, multiple applications may be managed by authentication management process 105, each attempting to login to database 110 at overlapping points in time.

Figure 7:
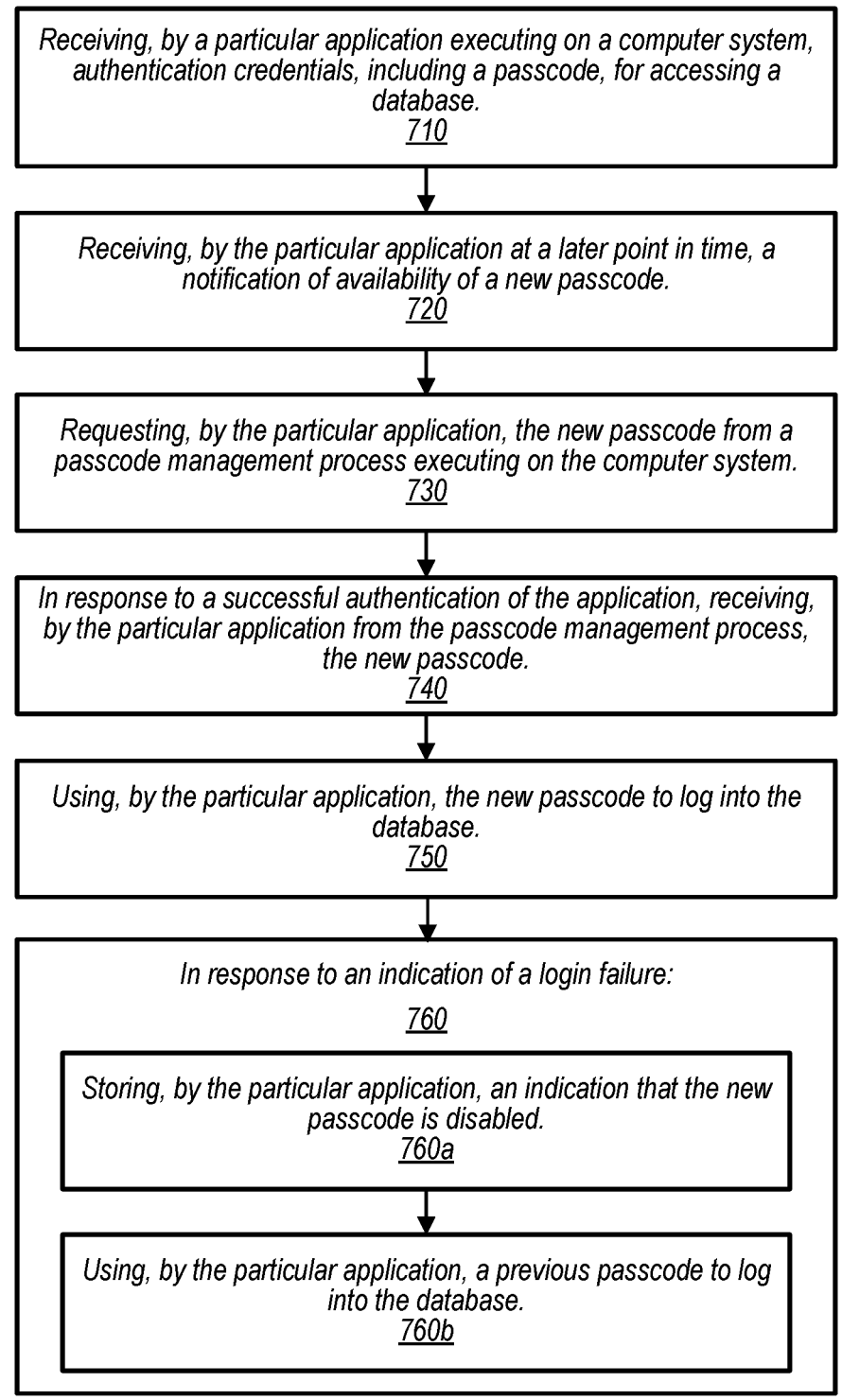
FIG. 7 depicts a flow diagram of an embodiment of a method for an application to receive a new passcode.

Moving to FIG. 7, a flow diagram of an embodiment of a method for receiving a new passcode by an application is illustrated. Method 700 may, in some embodiments, be performed by a computer in system 100 in FIGS. 1-4, such as computer system 101 or a different computer that isn't shown. The computer may, for example, include (or have access to) a non-transitory, computer-readable medium having program instructions stored thereon that are executable by the computer system to cause the operations described with reference to FIG. 7. Referring collectively to FIG. 2 and method 700 in FIG. 7, the method begins in block 710.

Method 700, in block 710, includes receiving, by application 120*a* executing on a computer system, authentication credentials, including a passcode, for accessing database 110. As illustrated, application 120*a* may receive one or more passcodes that provide access to database 110. For example, application 120*a* may receive the one or more passcodes in an initialization process that occurs when application 120*a* is launched. The passcodes are used to authenticate application 120*a* for accessing database 110 in order to store or retrieve data associated with tasks performed by application 120*a*, and/or to utilize one or more processes (e.g., applets) for performing these tasks.

At block 720, method 700 further includes receiving, by application 120*a* at a later point in time, a notification of availability of new passcode 115. Authentication management process 105, as described above, manages distribution of passcodes among a plurality of applications, including application 120*a*. Passcodes may be updated to increase a level of security of database 110. The more frequently that the passcodes are changed, the more difficult it may be for a hacker to gain access to database 110. When authentication management process 105 has new passcode 115 available for distribution, the notification is sent to the plurality of applications, including application 120*a*.

Method 700 also includes, at block 730, requesting, by application 120*a*, new passcode 115 from authentication management process 105 executing on the computer system. In response to the notification, application 120*a* may send a request to authentication management process 105 to retrieve new passcode 115. In some embodiments, application 120*a* may send the request subsequent to receiving the notification. In other embodiments, application 120*a* may be configured to periodically request a new passcode from authentication management process 105. In such embodiments, the notification may be an indication that a time period has elapsed and it is ow time to request a new passcode.

Method 700, at block 740, also includes in response to a successful authentication of application 120a, receiving, by application 120a from authentication management process 105, new passcode 115. As shown, application 120a is challenged, by authentication management process 105, for login credentials to prove an identity of application 120a. For example, application 120a may provide an application context to authentication management process 105. This application context (e.g., application context 440 in FIG. 4), may provide an indication of the identity, including, a security level and type, for application 120a. Based on the authentication, application 120a may be sent new passcode 115. In some embodiments, application 120a may store a local copy of new passcode 115 in passcode repository 250. Passcode repository 250 may include, e.g., a local system RAM associated with application 120a, and/or a long-term nonvolatile memory.

At block 750, method 700 includes using, by application 120a, new passcode 115 to login to database 110. At a next opportunity, application 120a may use new passcode 115 to access database 110. In some embodiments, the next opportunity may correspond to a next time application 120a has a need to access database 110. In other embodiments, application 120a, while active, may remain logged-in to database 110 and, to increase security, periodically re-authenticate with database 110.

Method 700 further includes, at block 760, in response to an indication of a login failure, performing additional operations, including, at block 760a, storing, by application 120a, an indication that new passcode 115 is disabled. As described herein, new passcode 115 may be distributed to some applications, such as application 120a, before being enabled on database 110. Accordingly, new passcode 115 may not provide access to database 110 for some amount of time between distribution to application 120a and enabling on database 110. During this time, application 120a receives a login failure 230a from database 110, indicating that new passcode 115 has failed to authenticate application 120a. In response to login failure 230a, application 120a stores an indication that new passcode 115 is not currently valid. For example, application 120a may set state 315b, as shown in FIG. 3, to a value indicative of the current invalid state of new passcode 115.

Block 760 further includes performing operations of block 760b, including using, by application 120a, a previous passcode to login to database 110. To gain (or regain) access to database 110, application 120a may select one of prior passcodes 215 from passcode repository 250, and uses the selected prior passcode 215 to login to database 110. If another login failure is indicated, then application 120a may repeat the login attempt with a different one of prior passcodes 215. Application 120a may repeat this login process until either a successful login in performed, or a threshold number of retries occurs, as described above.

It is noted that method 700 of FIG. 7 may be repeat in response to a notification of an availability of a subsequent new passcode. Method 700 may, for example, return to block 720 in response to receiving the notification. Although illustrated in a serial order, operations of blocks 710-760 may occur in a different order, including, for example, some operations being performed concurrently. For example, the order of blocks 760a and 760b may be reversed or performance of the two blocks may overlap.

Figure 8:
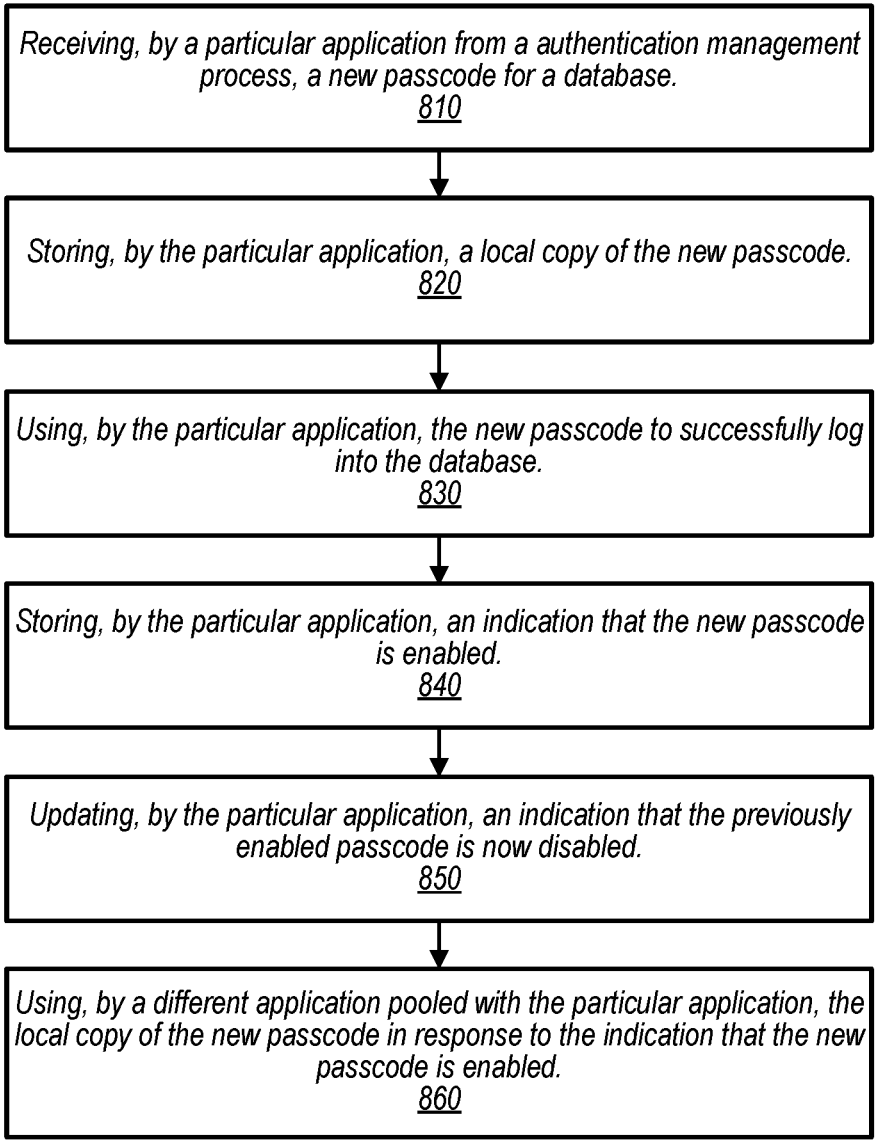
FIG. 8 illustrates a flow diagram of an embodiment of a method for sharing a new passcode between applications within a pool of applications.

Turning to FIG. 8, a flow diagram of an embodiment of a method for sharing, by a pool of applications, a new passcode is illustrated. In various embodiments, method 600 may be performed by a computer in system 100 in FIGS. 1-4, such as computer system 101 or a different computer that isn't shown. The computer may, for example, include (or have access to) a non-transitory, computer-readable medium having program instructions stored thereon that are executable by the computer system to cause the operations described with reference to FIG. 8. Referring collectively to FIGS. 3 and 8, method 800 begins in block 810.

Method 800, at block 810, includes receiving, by application 120a from authentication management process 105, new passcode 115 for database 110. In a manner as illustrated above, application 120a may receive new passcode 115 from authentication management process 105. New passcode 115 is used by application 120a as an authentication for accessing database 110. As shown, new passcode 115 includes several elements, including key data 315a, state 315b, and encryption 315c. Key data 315a includes the passcode that is sent to database 110 for an authentication process. State 315b indicates if key data 315a is currently enabled for use by database 110 and encryption 315c indicates whether key data 315a is delivered in an encrypted form, thereby requiring a decryption process before use. In some embodiments, state 315b may be set to indicate new passcode 115 is not currently valid when initially distributed.

At block 820, method 800 includes storing, by application 120a, a local copy of new passcode 115. As shown, application 120a may store a local copy of new passcode 115 in passcode repository 250. In various embodiments, passcode repository 250 may include memory locations in a system RAM associated with application 120a (e.g., a memory block allotted for use by application 120a), and/or locations in a nonvolatile memory for long-term storage.

Method 800, further includes, at block 830, using, by application 120a, new passcode 115 to successfully login to database 110. Application 120a, as illustrated, can use new passcode 115 to attempt to login to database 110. As previously disclosed, application 120a may, after receiving new passcode 115, attempt to use new passcode 115 at a next opportunity to login to database 110. This next opportunity may correspond to an elapsed amount of time from a previous login attempt in cases where application 120a maintains an active login session with database 110. In other embodiments, the next opportunity may correspond to application 120a performing a task in which access to database 110 is needed to complete the task, at which point application 120a initiates the login attempt.

Method 800, at block 840, also includes storing, by application 120a, an indication that new passcode 115 is enabled. In response to new passcode 115 being used successfully to login to database 110 on block 830, application 120a, as illustrated, may set state 315b to a value indicative of new passcode 115 currently being valid. This valid indication for state 315b may enable application 120b to identify the currently valid passcode for a subsequent login attempt.

At block 850, method 800 further includes updating, by application 120a, an indication that the previously enabled passcode is now disabled. In addition to identifying new passcode 115 as the currently valid passcode, a corresponding state indicator for the previously valid passcode may be set to indicate it is not the current valid passcode. For example, if prior passcode 215a is the valid passcode preceding new passcode 115, then the state value for prior passcode 215a is changed from a value such as "enabled" to a value such as "disabled."

Method 800 also includes, at block 860, using, by application 120b pooled with application 120a, the local copy of new passcode 115 in response to the indication that new passcode 115 is enabled. In the illustrated embodiment, a plurality of applications 120a-120n are pooled together. As previously described, application 120 may be pooled due to being executed on a same computer or same processor in a multi-processor computer, due to being associated with a common user, and the like. In some embodiments, application 120a may be a parent application that spawns applications 120b-120n.

As shown, the pooled applications utilize the same passcode repository 250. Based on this sharing, applications 120b-120n may use the local copy of new passcode 115 from passcode repository 250 rather than making individual requests for new passcode 115 from authentication management process 105. This sharing may prevent extraneous network traffic between applications 120 and authentication management process 105. Authentication management process may send notifications of new passcode 115 to a particular one application within each of a plurality of application pools. If there are an average of ten applications per pool, such a technique could reduce network traffic due to passcode updates by ninety percent. In addition, since application 120a not only receives new passcode 115 for the application pool, but also validates new passcode 115 with database 110, additional network traffic may be avoid by eliminating a need for each of applications 120b-120n to individually validate new passcode 115. In addition to network traffic, bandwidth of authentication management process 105 and of database 110 may be increased by eliminating their respective needs to respond to each application in each pool for passcode validation tasks.

The method of FIG. 8, it is noted, includes elements 810-860. Method 800, or a portion thereof, may be repeated for each occurrence of a passcode update. In addition, block 860 may be repeated for each of applications 120b-120n performing a login attempt to database 110. Method 800 may, in some cases, be performed in parallel with all or portions of methods 500, 600, and/or 700. For example, a performance of method 500 may, in whole or in part, precede a performance of method 800. In an enterprise computer system, multiple instances of each of methods 500-800 may be active at a given point in time. It is further noted that any or all of methods 500-800 may be performed in an automated fashion without user input.

Figure 9:
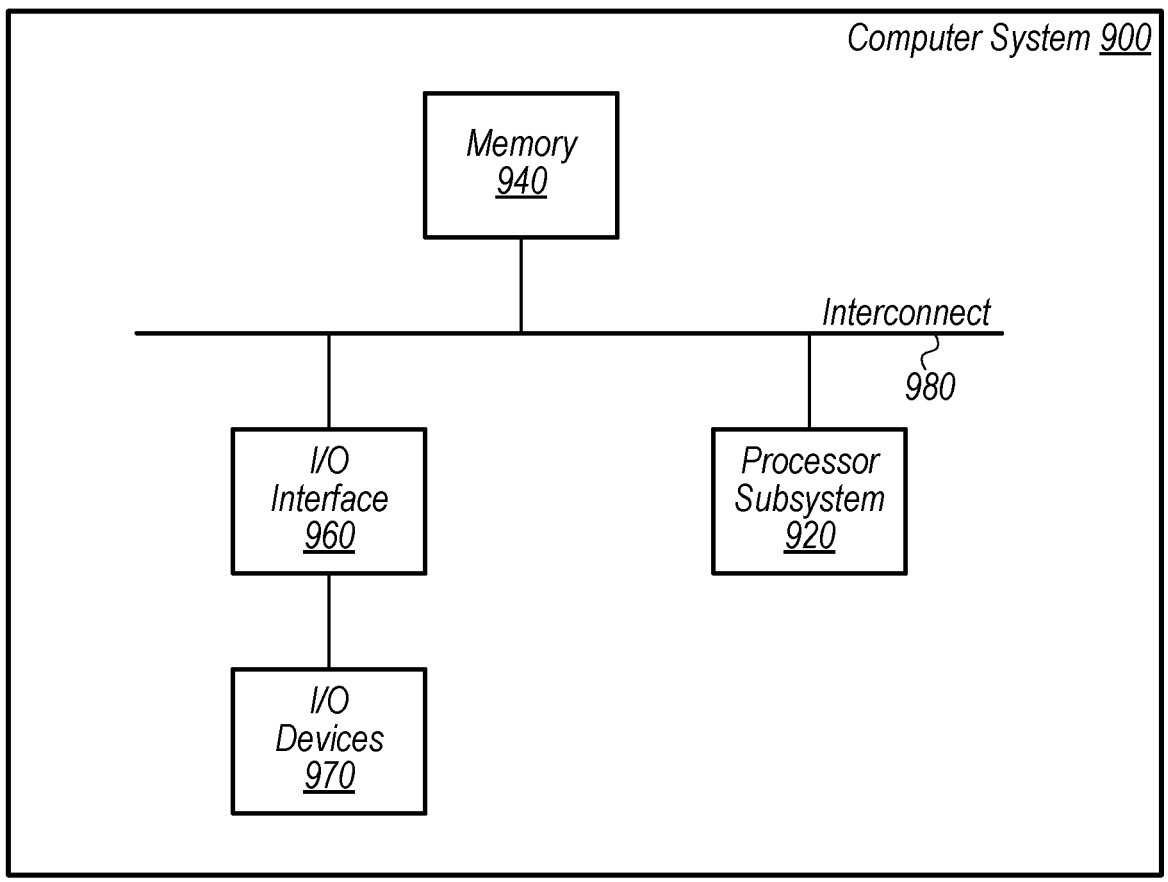
FIG. 9 is a block diagram illustrating an example computer system, according to some embodiments.

Referring now to FIG. 9, a block diagram of an example computer system 900 is depicted. Computer system 900 may, in various embodiments, implement one or more of the disclosed computer systems, such as computer system 101 in FIG. 1 and/or other computers in system 100 and referred to in the descriptions of FIGS. 1-8. Computer system 900 includes a processor subsystem 920 that is coupled to a system memory 940 and I/O interfaces(s) 960 via an interconnect 980 (e.g., a system bus). I/O interface(s) 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause computer system 900 perform various operations described herein. System memory 940 may be implemented using different physical, non-transitory memory media, such as hard disk storage, floppy disk storage, removable disk storage, flash memory, random access memory (RAM—SRAM, EDO RAM, SDRAM, DDR SDRAM, LPDDR SDRAM, etc.), read-only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interfaces 960 may be any of various types of interfaces configured to couple to and communicate with other devices, according to various embodiments. In one embodiment, I/O interface 960 is a bridge chip (e.g., Southbridge) from a front-side to one or more back-side buses. I/O interfaces 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over WiFi, Bluetooth, Ethernet, etc.), and computer system 900 is coupled to a network via the network interface device.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method comprising:
   authorizing, by an authentication management process executing on a computer system, a plurality of applications to access a database;
   sending, by the authentication management process, one or more passcodes to the authorized applications;
   in response to an authentication update request, selecting, by the authentication management process, a new passcode for accessing the database;
   sending, by the authentication management process to the plurality of applications, a notification that the new passcode is available, wherein the new passcode is not enabled for use for accessing the database at a time when the notification is sent;
   in response to a request from a particular application of the plurality of applications, sending the new passcode to the particular application;
   determining, by the authentication management process, that each of the plurality of applications has retrieved the new passcode; and
   in response to the determining, enabling, by the authentication management process the new passcode for use by the plurality of applications for accessing the database; and
   wherein the method is performed such that the plurality of applications continue to have access to the database from when the new passcode is selected until the new passcode is enabled.

2. The method of claim 1, wherein accessing the database between receiving the new passcode and the enabling includes:
   using, by the particular application, the new passcode to access the database; and
   in response to an indication of a login failure, using, by the particular application, a previous passcode to access the database.

3. The method of claim 2, further comprising:
   in response to unsuccessfully trying a particular number of previous passcodes, reverting, by the particular application, to a protected access mode, wherein the protected access mode limits access of the particular application within the database.

4. The method of claim 2, wherein sending the one or more passcodes to the authorized applications includes providing a set of passcodes to individual ones of the authorized applications, a given one of the set of passcodes being valid at a given point in time; and
   wherein selecting the new passcode includes selecting, by the authentication management process, a least recently used passcode from the set of passcodes.

5. The method of claim 1, further comprising:
   in response to receiving the new passcode from the authentication management process, storing, by the particular application, a local copy of the new passcode; and
   in response to a successful login to the database using the new passcode:
      storing, by the particular application, an indication that the new passcode is enabled; and
      updating, by the particular application, an indication that a previously enabled passcode is now disabled.

6. The method of claim 5, further comprising, using, by a different application pooled with the particular application, the local copy of the new passcode in response to the indication that the new passcode is enabled.

7. The method of claim 1, further comprising:
   identifying, by the particular application, a currently enabled passcode to encrypt data to store in the database by iterating through a set of saved local copies of passcodes until an enabled passcode is identified; and
   identifying, by the particular application, a particular passcode to decrypt data stored in the database by iterating through the set of saved local copies of passcodes until the data is successfully decrypted.

8. The method of claim 1, wherein the new passcode is a symmetric key, and further comprising distributing, by the authentication management process, additional asymmetric keys and secure shell protocol (SSH) keys.

9. The method of claim 1, wherein authorizing the plurality of applications to access the database includes:
   using, by the authentication management process, a respective application context to identify a given application of the plurality; and
   selecting a particular set of one or more passcodes to send to the given application based on an identity of the given application.

10. A system including:
    a computer system including one or more computer devices;
    a database configured to:
       in response to receiving a valid passcode, grant access to a given application executing on the computer system;
       in response to a determination that the valid passcode has not been updated for a threshold amount of time, send a request to an authentication management process executing on the computer system;
    wherein the computer system is configured to:
       authorize, using the authentication management process, a plurality of applications to access the database;
       generate, using the authentication management process, a new passcode;
       notify the plurality of applications that the new passcode is available, wherein the new passcode is enabled for accessing the database at a subsequent time after the plurality of applications have received the new passcode;
       in response to a request from a particular application of the plurality of applications, send the new passcode to the particular application; and
       in response to a determination that each of the plurality of applications has received the new passcode, enabling the new passcode for the database, wherein the particular application has access to the database between receiving the new passcode and the enabling.

11. The system of claim 10, wherein to authorize the plurality of applications to access the database, the computer system is configured to:
    use a respective application context to identify the given application of the plurality of applications; and
    provide, based on an identity of the given application, a plurality of passcodes to the given application, wherein ones of the plurality of passcodes are used for different tasks associated with the database.

12. The system of claim 11, wherein to generate the new passcode, the computer system is configured to generate respective new passcodes for the plurality of passcodes.

13. The system of claim 10, wherein the database is further configured, in response to detecting a threshold number of failed login attempts, to alert the computer system, and wherein the computer system is further configured, in response to the alert, to:
generate, using the authentication management process, a different passcode; and
notify the plurality of applications that the different passcode is available.

14. The system of claim 10, wherein the database is further configured, in response to detecting abnormal activity, to alert the computer system, and wherein the computer system is further configured, in response to the alert, to:
generate, using the authentication management process, a different passcode; and
notify the plurality of applications that the different passcode is available.

15. A method, comprising:
receiving, by a particular application executing on a computer system, authentication credentials, including a passcode, for accessing a database;
receiving, by the particular application at a later point in time, a notification of availability of a new passcode;
requesting, by the particular application, the new passcode from an authentication management process executing on the computer system;
in response to a successful authentication of the particular application, receiving, by the particular application from the authentication management process, the new passcode;
using, by the particular application at a particular point in time, the new passcode to login to the database; and
in response to an indication of a login failure:
storing, by the particular application, an indication that the new passcode is disabled; and
using, by the particular application, a previous passcode to login to the database;
using, by the particular application at a subsequent point in time, the new passcode to login to the database; and
in response to an indication of a successful login, updating, by the particular application, the indication to indicate that the new passcode is enabled.

16. The method of claim 15, further comprising, sending, by the particular application prior to receiving the authentication credentials, an application context to the authentication management process;
wherein receiving the authentication credentials includes receiving a set of passcodes, and wherein a given one of the set of passcodes is valid at a given point in time.

17. The method of claim 16, wherein receiving the new passcode includes receiving, by the particular application from the authentication management process, an indication of a currently valid passcode of the set of passcodes.

18. The method of claim 15, further comprising:
in response to receiving the new passcode from the authentication management process, storing, by the particular application, a local copy of the new passcode; and
in response to the indication of the successful login to the database using the new passcode, updating, by the particular application, an indication that the previous passcode is enabled to indicate that the previous passcode is now disabled.

19. The method of claim 18, further comprising, using, by a different application pooled with the particular application, the local copy of the new passcode in response to the indication that the new passcode is enabled.

20. The method of claim 15, further comprising:
identifying, by the particular application, a currently valid passcode to encrypt data to store in the database by iterating through a set of saved passcodes until an enabled indication is identified; and
identifying, by the particular application, a particular passcode to decrypt data received from the database by iterating through the set of saved passcodes until the data is successfully decrypted.

* * * * *